Sept. 8, 1970 C. S. LADEWSKI 3,526,979
SNOW PLOW WITH ADJUSTABLE BLADES
Filed Sept. 12, 1969 3 Sheets-Sheet 2
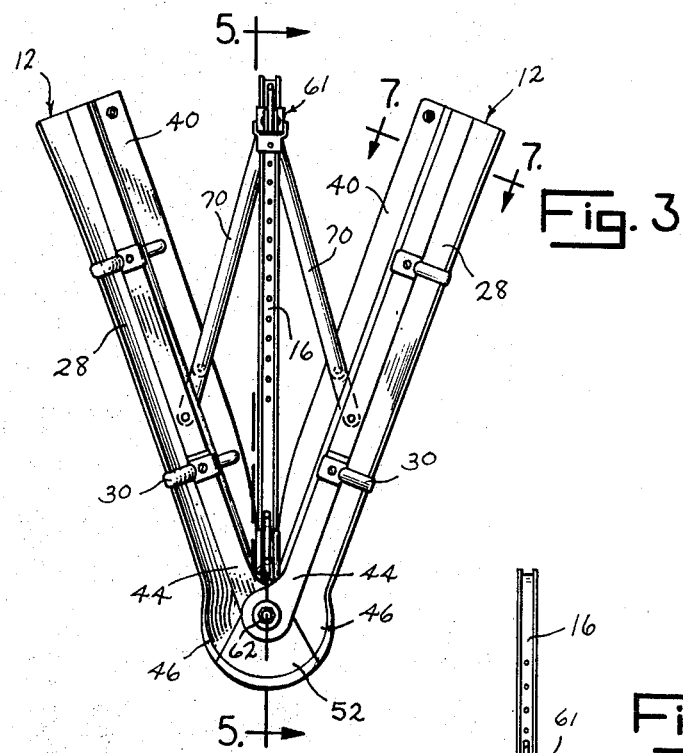
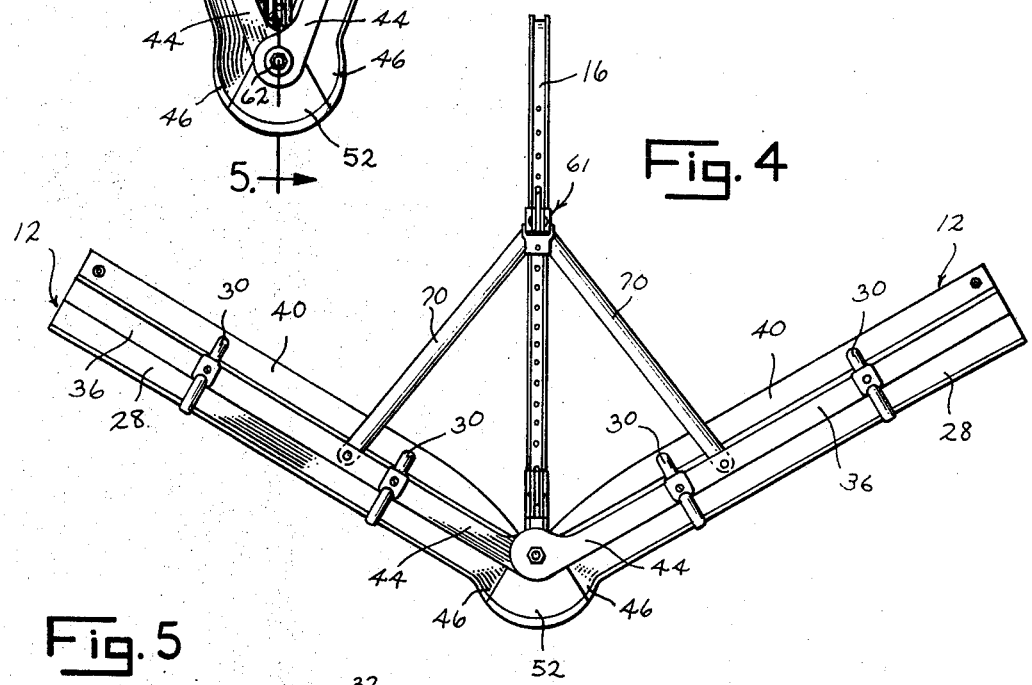
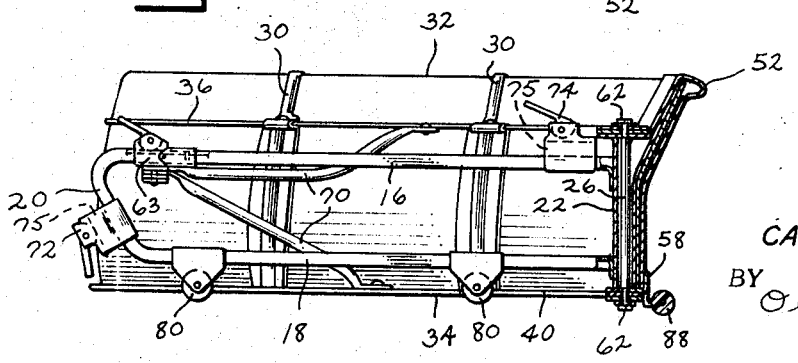
INVENTOR.
CASIMER S. LADEWSKI
BY Oltsch & Knoblock
ATTORNEYS Sept. 8, 1970
C. S. LADEWSKI
3,526,979
SNOW PLOW WITH ADJUSTABLE BLADES
Filed Sept. 12, 1969
3 Sheets-Sheet 3
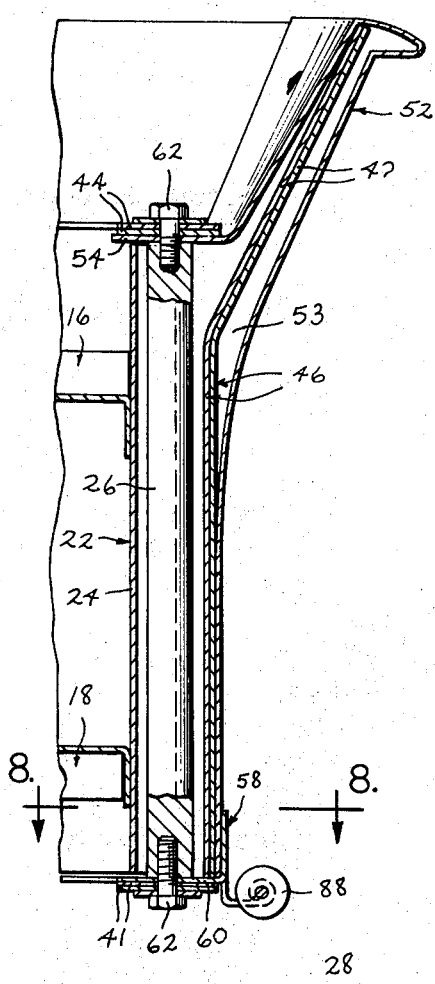
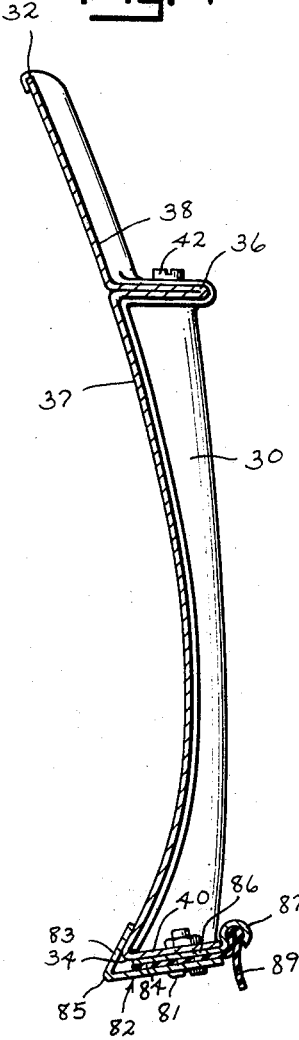
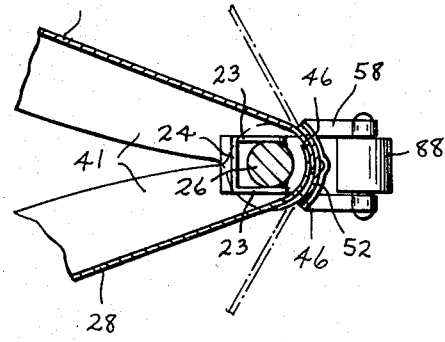
INVENTOR.
CASIMER S. LADEWSKI
BY Oltsch & Knoblock
ATTORNEYS

United States Patent Office 3,526,979
Patented Sept. 8, 1970

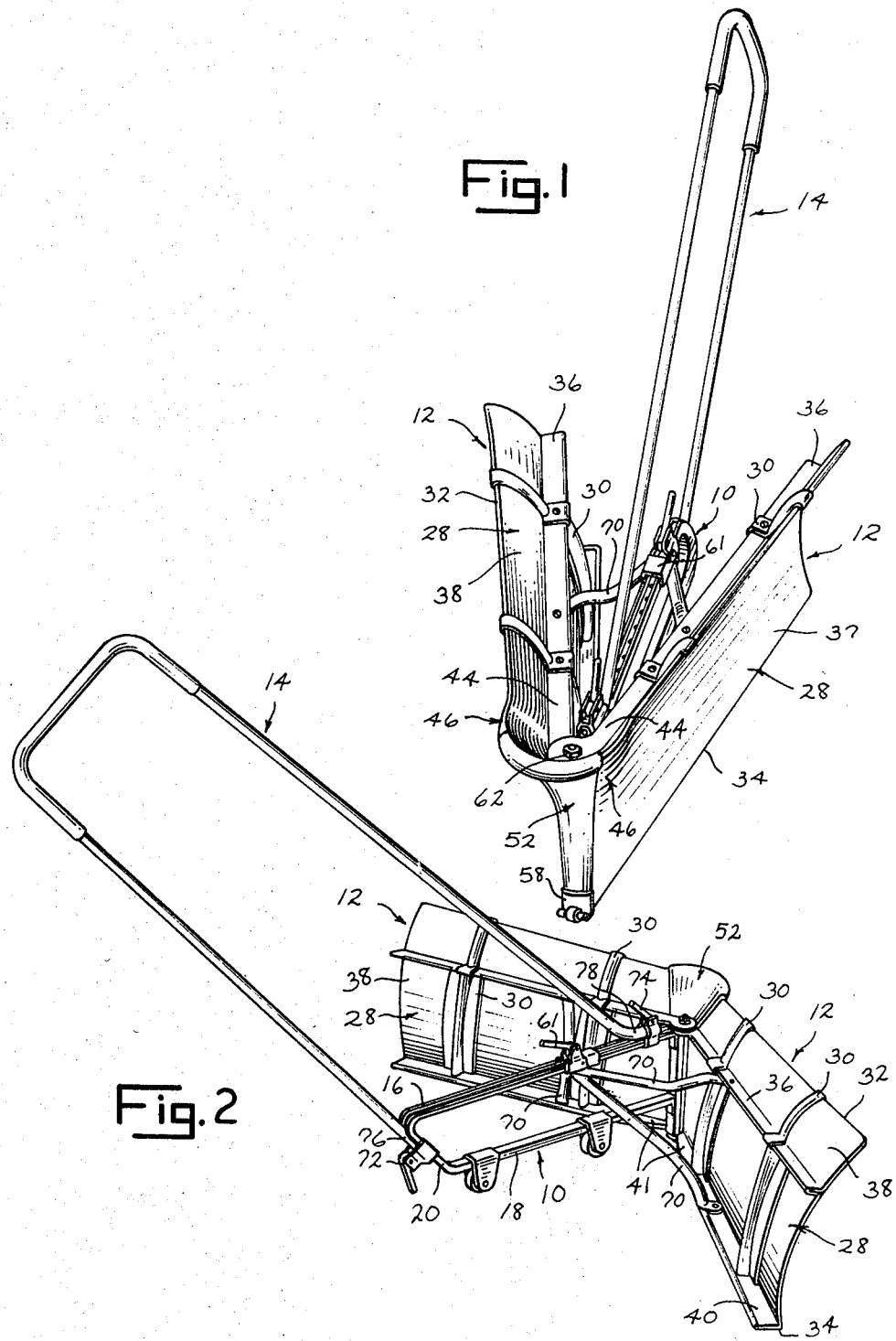

3,526,979
SNOW PLOW WITH ADJUSTABLE BLADES
Casimer S. Ladewski, 807 W. La Salle St.,
South Bend, Ind. 46601
Filed Sept. 12, 1969, Ser. No. 857,436
Int. Cl. E01h 5/04
U.S. Cl. 37—44
9 Claims

ABSTRACT OF THE DISCLOSURE

A snow plow having a longitudinal frame support and a pair of blades connected to the frame support. The blades extend outwardly from opposite sides of the frame support with each such blade being pivotally connected about the same axis to the forward end of the support. A handle is connected to the frame support and extends rearwardly of the pivotal connection of the blades to the support. Adjustable means are provided for retaining the blades in selected angular relationship relative to the frame support. An end portion of each blade extends forwardly of an partially around the pivot connection of its blade and is radially spaced from the pivotal axis of the blades. Such an end portion of one blade overlies the similarly shaped end portion of the other blade and is shiftable thereover upon adjustment of the angular relationship of the blades relative to the frame support.

SUMMARY OF THE INVENTION

This invention relates to a snow plow and more specifically concerns an improvement to a hand pushed plow adapted to remove snow from sidewalks and driveways.

This invention relates to a snow plow having a pair of oppositely extending blades which are pivotally connected about a common axis to a support and concerns in particular the cooperating relationship of the blades. Each blade has one end portion which extends forwardly of and partially around the blade pivot connection with the support and which is radially spaced from the pivotal axis of the blades. Such an end portion of one blade overlies the similarly shaped end portion of the other blade and is shiftable thereover upon angular adjustment of the blades relative to the support. A cover plate is preferably mounted to the fore end of the frame support and extends over the overlapped end portions of the blades. The cover plate is preferably of arcuate shape and defines, in conjunction with the support, a channel which receives the overlapped blade end portions.

By providing overlapped blade end portions at the plow's apex, snow and other foreign material is substantially prevented from entering and causing clogging and icing of the pivot connection of the blades to the support. This enables the user of the plow to easily vary the span of his plow. The handle of the snow plow is constructed so as to be readily detachable from the support when it is desired to store the plow. Replaceable hardened metal wear plates are mounted along the lower edge of each blade so as to provide at all times a sharp leading plow edge for skimming the upper surface of the walk or driveway and to enable the remaining parts of the plow to be constructed of a light weight material, such as aluminum or magnesium, which otherwise would be susceptible to great wear upon repeated contact with the walk or driveway. Additionally, a rubber strip is preferably attached to each blade along the lower edge thereof. Each rubber strip extends below the outline of the lower edge of the blade and is adapted to contact the upper surface of the driveway or sidewalk and thus act as a scraper to remove slush and associated water accumulations thereon.

Accordingly, it is an object of this invention to provide a snow plow having angularly adjustable blades which are pivotally connected to a support and which include cooperating parts to prevent icing and clogging of the pivotal connection of the blades during use of the plow.

It is another object of this invention to provide a hand-operated snow plow which is of economical construction and which includes scraping means for removing slush and wet snow from a sidewalk or a driveway.

Still another object of this invention is to provide a hand-operated snow plow of light weight construction having interchangeable wear parts which are adapted to enage the upper surface of a sidewalk or driveway.

Other objects of the invention will become apparent upon a reading of the invention's decription.

BRIEF DESCRIPTION OF THE DRAWINGS

A preferred embodiment of this invention has been chosen for purposes of illustration and description wherein:

FIG. 1 is a perspective view of the snow plow with the blades thereof in a retracted position.

FIG. 2 is a perspective view of the snow plow with the blades thereof in an extended position.

FIG. 3 is a top plan view of the snow plow with the handle thereof removed and the blades thereof in a retracted position.

FIG. 4 is a top plan view of the snow plow with the handle removed therefrom and with the blades thereof in an extended position.

FIG. 5 is a sectional view of the snow plow taken along line 5—5 of FIG. 3.

FIG. 6 is an enlarged fragmentary view of the front sectioned portion of the snow plow as shown in FIG. 5.

FIG. 7 is a sectional view taken along line 7—7 of FIG. 3.

FIG. 8 is a sectional view taken along line 8—8 of FIG. 6.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The snow plow of this invention includes a support 10 having fore and aft ends, a pair of blades 12, each pivoted about a common axis to the fore end of support 10 and extending outwardly therefrom, and a handle 14 which is attached to support 10 and which extends rearwardly of blades 12.

Support 10 preferably includes an upper longitudinal frame part 16, a lower longitudinal frame part 18 spaced below and positioned substantially parallel to upper frame part 16, and end parts 20 and 22 which serve to connect the upper and lower frame parts. For purposes of illustration, end part 20 of support 10 shall be considered the aft end and end part 22 shall be considered the fore end of the support. End part 22 is preferably channel-shaped and includes spaced sides 23 which extend forwardly of support 10 and an interconnecting web portion 24 connected, as by welding, to the ends of the upper and lower frame parts 16 and 18. A cylindrical support 26 is fixedly dipsosed within end part 22 and extends the full length thereof. Cylindrical support 26 may be retained within end part 22 by welding side portions 23 of the end part to the support.

Each blade 12 includes a concavo-convex panel portion 28 which is defined by a concave outer surface 37, a convex inner surface 38, upper edge 32 and a lower edge 34. An integral horizontal rib 36 extends outwardly from convex surface 38 and along the length of blade portion 28. A flange 40 extends outwardly from convex surface 38 along lower edge 34 of blade portion 28 and is turned slightly upwardly. Each blade 12 includes at least one and preferably a plurality of vertical ribs 30 which extend from flange 40 upwardly over rib 36 to upper edge 32 of blade portion 28. Each rib 30 may be welded to blade portion 28 or attached thereto by having the upper margin of the rib bent over upper edge 32 of the blade portion and by inserting a screw 42 through the rib and into horizontal rib 36 of the blade portion, as shown in FIG. 7. Ribs 36 and 30 and flange 40 provides rigidity to blade panel portion 28 and thereby enable the blade to be formed of a thin walled, light weight material, such as aluminum or magnesium.

Each blade 12 includes an end portion 46 which integrally joins and is continuous with panel portion 28. Each end portion 46 protrudes outwardly of the plane of outer surface 37 of its blade portion 28. A hinge part 44 is attached, as by welding, to each blade, preferably at rib 36 thereof. Each hinge part extends longitudinally of its blade beyond the junction of blade portions 28 and 46 thereof and terminates spacedly behind blade end portion 46. Flange 40 which is positioned along the lower edge 34 of each blade portion 28 projects longitudinally beyond the junction of blade portions 28 and 46 and terminates behind blade portion 46 and spacedly under hinge part 44. Hinge part 44 and projecting part 41 of flange 40 of each blade have aligned apertures therein. Cylindrical support 26 is disposed between the hinge and projecting flange parts of each blade with corresponding hinge and projecting flange parts of the blades overlapping and pivotally connected, as shown in FIG. 6, to the end faces of cylindrical support 26 by bolts 62. Bolts 62 extend through the apertures in the overlapped hinge and projecting parts and are threaded into support 26.

Each blade end portion 46 extends forwardly of the pivot connection of its blade to the support 10 and is formed into an arcuate bend which partially encloses cylindrical support 26 and which is equally radially spaced from the pivotal axis of the blades, as best shown in FIG. 8. Blade end portions 46 overlap and preferably slidably engage one another as blades 12 are pivoted concentrically about cylindrical support 26. Each end portion 46 also preferably has a forwardly projecting upper margin 47.

A cover plate 52 is preferably mounted to the apex or forward end of the plow and covers the overlapped end portions 46 of the blades. Cover plate 52 includes a tab 54 which is positioned between the upper end face of cylindrical support 26 and the innermost blade end portion 46 and which is anchored to support 26 by bolt 62 or by welding. Cover plate 52 extends upwardly and forwardly from tab 54, over the upper edge of blade end portions 46, and then downwardly and rearwardly in front of end portions 46. Cover plate 52 is arcuately bent about the pivotal axis of the blades 12 and forms, in association with the blades, a continuous V-shaped snow-engaging blade surface. A bracket 58 is attached, such as by welding, to the lower edge of cover plate 52 and includes a tab part 60 which extends under and projects rearwardly of the overlapped end portions 46 of the blade. Tab part 60 is positioned between the lower end face of cylindrical support 26 and the overlapped projecting parts 41 of flanges 40 and is anchored to support 26 by bolt 62 or by welding. Cover plate 52 forms, in association with cylindrical support 26, a channel 53 within which the overlapped blade end portions 46 are received with slight clearance.

A clamp 61 is mounted to upper frame part 16 of support 10 and includes a bracket part 63 which is shiftable along the frame part and which can be locked thereto at selected locations. Clamp 61 may be of the cam-lever type, as illustrated in the drawings, or of some other type, such as the hand setscrew type. A pair of braces 70 interconnect catch 61 and each blade 12. One brace of each pair of braces 70 has one end pivotally connected to bracket part 63 of catch 61 and has its opposite end pivotally connected to flange 40 of the interconnected blade. The other brace of each pair of braces 70 also has one end pivotally connected to catch bracket part 61 and has its opposite end pivotally connected to horizontal rib 36 of the blade. The braces 70 interconnecting blades 12 with catch 61 preferably have their blade connected ends equally radially spaced from the pivotal axis of the blades so as to enable the blades to be simultaneously and equal angularly swung about cylindrical support 26 between extended and retracted positions as catch 61 is shifted fore and aft along longitudinal frame part 16 of support 10.

A quick-release socket defining clamp 72, such as the cam-lever type, is attached to end part 20 of support 10 and a similar clamp 74 is attached to longitudinal frame part 16 adjacent support end part 22. Handle 14 is of a U-shape configuration having free ends 76 and 78 which are inserted into the socket portions 75 of clamps 72 and 74 respectively and locked therein.

A plate 82 formed of a wear-resistant material, such as hardened steel, and having an upturned outer edge 83 is attached to the bottom surface of flange 40 of each blade 12 with outer edge 83 overlapping lower edge 34 of the blade. Plate 82 is detachably secured to flange 40 by bolts 81 and serves as a cover or wear plate for the lower edge of the blade. To provide for the removal of slush or water from the driveway or sidewalk, a flexible shape-retaining rubber strip 84 extending the length of each blade may be clamped between plate 82 and the bottom surface of flange 40. A bracket 86 is also clamped between plate 82 and flange 40 of each blade and overlies strip 84. Bracket 86 includes a downturned outer marginal edge 87 located rearwardly of and above lower edge 34 of the blade. The free end 89 of strip 84 engages bracket edge 87 and is turned downwardly so as to extend below bend 85 in plate 82. It is to be understood that strip 84 may be formed of materials other than rubber, such as wire mesh or plastic.

Wheels 80 may be mounted to lower longitudinal frame part 18 of support 10 and positioned so as to cause the plow to be supported by the wheels and blades 12, including plates 82 attached thereto, to be carried just slightly above the upper surface of the driveway or sidewalk. The free ends of rubber strips 84 attached to the lower edge of blades 12 preferably contact the upper surface of the driveway or sidewalk so as to form a scraper for slush and water removal. A wheel 88 may be rotatively mounted to bracket 58 with its outer lowermost periphery preferably even with the lower front edge of the plow. Wheel 88 serves to make contact with any bumps and raises in the sidewalk or drive so as to permit the forward end of the plow to be carried over the obstruction without interference.

To operate the plow of this invention, end portions 76 and 78 of handle 14 are inserted into cooperating clamps 72 and 74 and locked in place. Clamp 61 is shifted along upper frame part 16 of support 10, thereby causing blades 12 to be pivoted about cylindrical support 26. Once the desired blade span has been obtained, clamp 61 is locked. In varying the span of blades 12, it is important to note the cooperative relationship of the overlapped end portions 46 of the blades. As blades 12 pivot about cylindrical support 26 between the extended position shown in FIG. 4 and the retracted position shown in FIG. 3, portions 46 thereof slide over each other within cover plate 52. This arrangement of plow parts substantially prevents the snow, slush, and foreign matter, such as cinders, from contacting and causing clogging and icing of the pivotal connection parts of the blades. Once the sidewalk or driveway has been cleared, catch 61 is released and shifted rearwardly so as to place blades 12 in their retracted position. Handle 14 may then be removed for purposes of storing the plow.

What I claim is:

1. In a snow plow including a longitudial support having fore and aft ends, first and second blades extending outwardly from opposite sides of said support and each pivotally connected about the same axis to the fore end of said support, handle means extending rearwardly of said blades, means for retaining said blades in selected angular relationship to said support, the improvement wherein each blade has a snow engaging panel portion and an arcuate end portion, each arcuate end portion extending substantially continuously from the upper edge to the lower edge of said blade and extending forwardly of and partially around the pivot connection of its blade and being radially spaced from the pivotal axis of said blades, the arcuate end portion of said first blade overlapping and being concentric with the arcuate end portion of said second blade and being shiftable thereover upon adjustment of the angular relationship of said first and second blades relative to the support, thereby shielding said pivot connection from snow.

2. The snow plow of claim 1 and including a cover plate mounted to the fore end of said support and extending forwardly therefrom over the overlapped end portions of said first and second blades.

3. The snow plow of claim 2 wherein said cover plate is of an arcuate shape and defines in association with said support a channel receiving with slight clearance the overlapped end portions of said first and second blades.

4. The snow plow of claim 1 wherein said support includes upper and lower longitudinal parts, said blade adjustment means including a catch shiftable along one of said support parts, a brace member extending from said catch to each blade, each brace member having one end pivotally connected to said catch and its other end pivotally connected to a blade outwardly spaced from the pivot connection thereof, said catch upon being shifted causing adjustment of the angular relationship of said first and second blades relative to said support member.

5. The snow plow of claim 4 and including at least one wheel connected to said lower support part and having circumferential parts thereof projecting below the lower edges of said blades.

6. The snow plow of claim 1 and including a detachable wear plate attached to each blade and extending along and below the lower edge thereof.

7. The snow plow of claim 1 and including a strip of flexible shape-retaining material attached to each blade, each strip extending along and having a flange portion projecting below the outline of the lower edge of its blade.

8. The snow plow of claim 1 and quick release catch means mounted to said support for connecting said handle means to said support, said handle means engaging said catch means and being releasably retained thereby.

9. The snow plow of claim 1 and flexible means extending along the lower edges of said blades and including parts adapted to engage the upper surface of a walk or driveway projecting below the outline of said lower blade edges.

References Cited

UNITED STATES PATENTS

| | | | |
|---|---|---|---|
| 1,811,436 | 6/1931 | Luyster et al. | 37—46 |
| 2,229,053 | 1/1941 | DeVaux | 37—53 |
| 2,333,360 | 11/1943 | Churchill | 37—44 |
| 2,350,437 | 6/1944 | Wiedman | 37—44 |
| 2,432,780 | 12/1947 | Mader | 37—53 |
| 2,552,016 | 5/1951 | Rose | 37—53 X |
| 2,702,212 | 2/1955 | McAneny | 37—44 X |
| 3,028,692 | 4/1962 | Brock | 37—53 X |
| 3,413,738 | 12/1968 | Goldberg | 37—53 X |
| 3,431,661 | 3/1969 | Carlson | 37—53 X |

FOREIGN PATENTS 55,700   1939   Denmark.

ROBERT E. PULFREY, Primary Examiner

E. H. EICKHOLT, Assistant Examiner

U.S. Cl. X.R.

37—46, 53